(12) United States Patent
Bhandari et al.

(10) Patent No.: US 11,683,324 B2
(45) Date of Patent: Jun. 20, 2023

(54) VERIFICATION OF IN-SITU NETWORK TELEMETRY DATA IN A PACKET-SWITCHED NETWORK

(71) Applicant: Cisco Technology, Inc., San Jose, CA (US)

(72) Inventors: Shwetha Subray Bhandari, Karnataka (IN); Santhosh N, Karnataka (IN); Rakesh Reddy Kandula, Karnataka (IN); Saiprasad Reddy Muchala, Karnataka (IN); Frank Brockners, Cologne (DE)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 17/846,381

(22) Filed: Jun. 22, 2022

(65) Prior Publication Data

US 2022/0329606 A1    Oct. 13, 2022

Related U.S. Application Data

(63) Continuation of application No. 16/916,368, filed on Jun. 30, 2020, now Pat. No. 11,444,955.

(51) Int. Cl.
*H04L 9/40* (2022.01)
*H04L 45/00* (2022.01)
*H04L 9/32* (2006.01)
*H04L 9/08* (2006.01)

(52) U.S. Cl.
CPC .......... *H04L 63/123* (2013.01); *H04L 9/0869* (2013.01); *H04L 9/321* (2013.01); *H04L 45/72* (2013.01); *H04L 63/0428* (2013.01); *H04L 63/0435* (2013.01)

(58) Field of Classification Search
CPC ..... H04L 9/0891; H04L 9/321; H04L 9/0869; H04L 63/0435; H04L 63/126; H04L 63/0428; H04L 63/123; H04L 45/72; H04L 2463/061
USPC ......................................................... 713/161
See application file for complete search history.

(56) References Cited

U.S. PATENT DOCUMENTS

| | | | |
|---|---|---|---|
| 8,413,243 B2 | 4/2013 | Haddad | |
| 8,473,736 B2* | 6/2013 | Gamer | H04W 12/086 370/328 |
| 8,607,305 B2 | 12/2013 | Neystadt et al. | |
| 8,700,890 B2 | 4/2014 | Runkis et al. | |

(Continued)

*Primary Examiner* — Amare F Tabor
(74) *Attorney, Agent, or Firm* — Lee & Hayes, P.C.

(57) ABSTRACT

Techniques to facilitate verification of in-situ network telemetry data of data packet of data traffic of packet-switched networks are described herein. A technique described herein includes a network node obtaining a data packet of data traffic of a packet-switched network. The data packet includes an in-situ network telemetry block. The network node obtains telemetry data and cryptographic key. The cryptographic key confidentially identifies the network node. The node encrypts at least a portion of the telemetry data based on the cryptographic key to produce signed telemetry data and updates telemetry-data entry of the in-situ network telemetry block. The telemetry data and signed telemetry data is inserted into the telemetry-data entry. The node forwards the data packet with the updated telemetry-data entry to another network node of the packet-switched network.

20 Claims, 7 Drawing Sheets

(56) References Cited

U.S. PATENT DOCUMENTS

| | | |
|---|---|---|
| 8,880,887 B2 | 11/2014 | Armatis |
| 9,369,287 B1* | 6/2016 | Sarvestani ............... G07D 7/01 |
| 9,652,599 B2* | 5/2017 | Medvinsky ............. G06F 21/10 |
| 11,044,099 B2 | 6/2021 | Bernat et al. |
| 11,082,525 B2 | 8/2021 | Sethuraman et al. |
| 2007/0036353 A1 | 2/2007 | Reznik et al. |
| 2011/0238996 A1* | 9/2011 | Xiao ................... H04L 63/0823 |
| | | 713/175 |
| 2016/0050122 A1 | 2/2016 | Cortes Gomez et al. |
| 2018/0181765 A1* | 6/2018 | Rietsch ................ G06F 21/602 |
| 2021/0409423 A1 | 12/2021 | Bhandari et al. |

\* cited by examiner

VERIFICATION OF IN-SITU NETWORK TELEMETRY DATA IN A PACKET-SWITCHED NETWORK

RELATED APPLICATIONS

This application claims priority to and is a continuation of U.S. patent application Ser. No. 16/916,368, filed on Jun. 30, 2020, the entire contents of which are incorporated herein by reference.

TECHNICAL FIELD

The present disclosure generally relates to facilitate of verification of in-situ network telemetry data of a data packet of data traffic of a packet-switched network.

BACKGROUND

Operations, administration and management or operations, administration and maintenance (OAM) are the processes, activities, tools, and/or standards involved with operating, administering, managing and maintaining a network of computing devices. Such a network may be a packet switching network that involves data packet transmission across network nodes. In some instances, the OAM may define a protocol for installing, discovering, monitoring, troubleshooting, remote fault detection, and the like of nodes on packet-switching networks.

With the so-called out-of-band OAM protocols, the OAM traffic is sent as dedicated traffic across the network nodes that is separate from the data traffic. In this instance, the OAM is not affected by the data traffic. Examples of such protocols include those that are part of Ethernet Connectivity Fault Management (CFM), Ping network utility, and Traceroute network diagnostic command.

In contrast, the so-called in-band OAM protocols, the OAM traffic is embedded in the data traffic, but not part of the data payload. The OAM is affected by data traffic. Examples of such protocols include Internet Protocol version 4 (IPv4) route recording.

BRIEF DESCRIPTION OF THE DRAWINGS

FIG. 1 illustrates an example network that implements facilitation of the verification of in-situ network telemetry data of a data packet of data traffic of a packet-switched network, in accordance with the techniques described herein.

Figure 1:
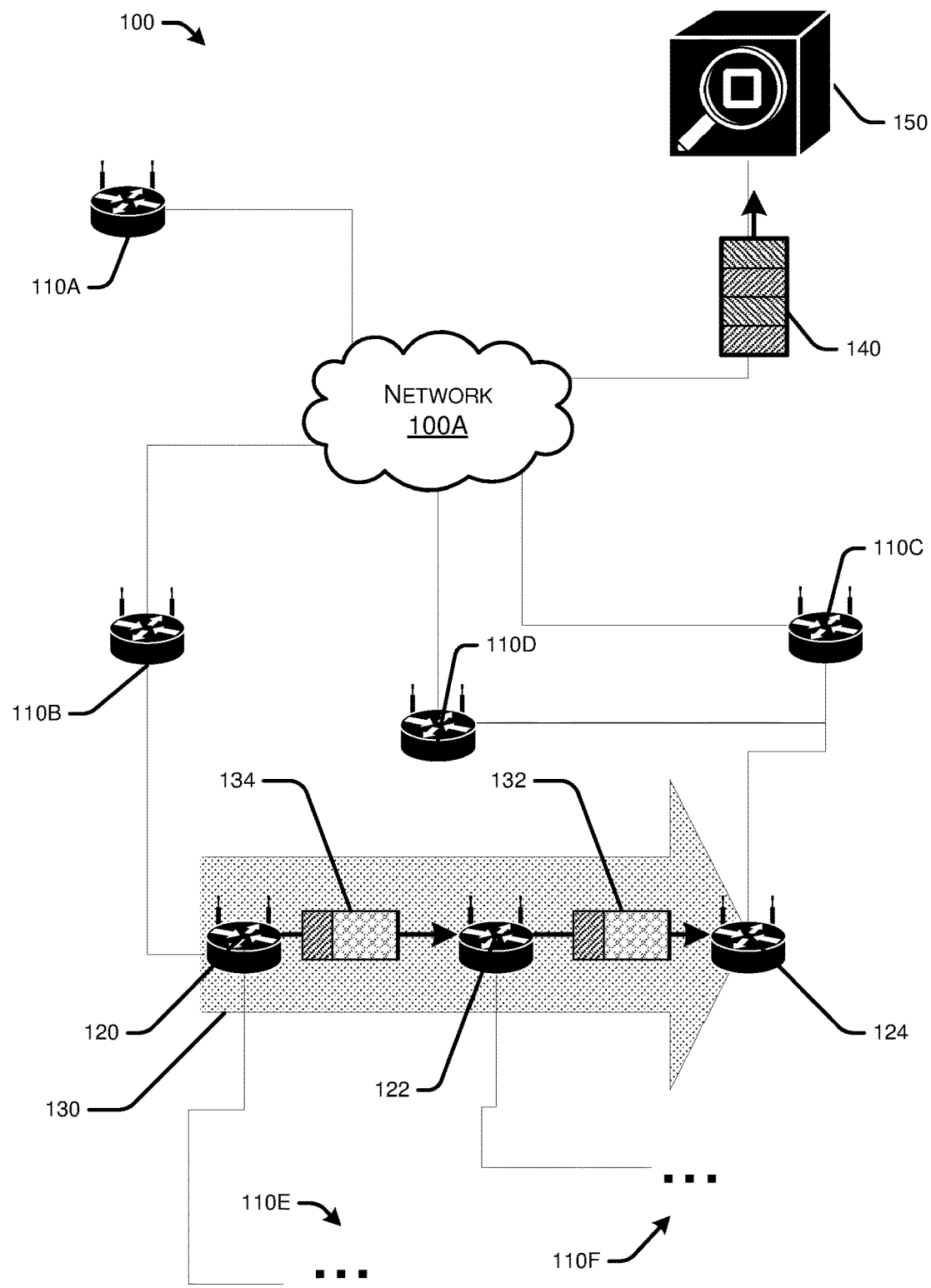
FIG. 1 illustrates

This detailed description of the drawings provides references to the accompanying figures. In the figures, the left-most digit(s) of a reference number identifies the figure in which the reference number first appears. The use of the same reference numbers in different figures indicates similar or identical items. The systems depicted in the accompanying figures are not to scale, and components within the figures may be depicted not to scale with each other.

DESCRIPTION OF EXAMPLE EMBODIMENTS

Overview

This disclosure describes techniques to facilitate the verification of in-situ network telemetry data of a data packet of data traffic of a packet-switched network. A method to perform the techniques described herein includes a network node obtaining a data packet of data traffic of a packet-switched network. The data packet includes an in-situ network telemetry block. Further, the method includes network node obtaining present telemetry data of the network node and the data packet and cryptographic key. The cryptographic key confidentially identifies the network node. The method further includes encryption of at least a portion of the present telemetry data based on the cryptographic key to produce signed telemetry data and update of a telemetry-data entry of the in-situ network telemetry block. The telemetry-data entry is associated with the network node. The update includes insertion of the present telemetry data and signed telemetry data into the telemetry-data entry. Further still, the method includes forwarding the data packet with the updated telemetry-data entry to another network node of the packet-switched network.

Another method to perform the techniques described herein includes a verification device of a packet-switched network obtaining an in-situ network telemetry block of a data packet of data traffic of a packet-switched network. Further, the method includes selecting a telemetry-data entry in the in-situ network telemetry block and extracting telemetry data and signed telemetry-data from the selected telemetry-data entry. The selected entry is associated with a particular network node. The method further includes obtaining a cryptographic key that identifies the particular network node and decrypting data of the signed telemetry-data based on the cryptographic key. Further still, the method includes a determination whether the decrypted data matches at least a portion of the telemetry data, and, in response to match determination, a verification of the telemetry data as a valid entry by the particular network node. That is, the verification device confirms that the particular network node did, indeed, provide the extracted telemetry data in the selected entry associated with that particular network node.

Additionally, the techniques described herein may be performed by a system and/or device having non-transitory computer-readable media storing computer-executable instructions that, when executed by one or more processors, performs the method described above.

Example Embodiments

This disclosure describes techniques to facilitate the verification of in-situ network telemetry data of a data packet of data traffic of a packet-switched network. A packet-switched network is a digital network of nodes that exchange data in packets. A data packet includes an informational header and a payload, which is that actual message being transmitted. Herein, data traffic is a sequence or collection of related or connected data packets. For example, data traffic may consist of ten data packets whose payloads, when sequenced together, form one message, such as the sentence: "Meet me for coffee at 1 pm."

In a packet-switched network, some of the packets that are exchanged are intended to transmit a message from one point to another. These packets are called data packets herein and are part of the so-called data plane. In contrast, some of the packets that are exchanged are intended to help control and/or manage the network itself. These packets are called control packets herein and are part of the so-called control plane.

During the operations, administration and maintenance (OAM) of packet-switched networks, network telemetry may be performed. Network telemetry includes measurements, gathering of those measurements, and automated transfer of the gathered measurements from across the network. Network telemetry data includes a collection of measurements or other data derived from nodes or other distributed or remote points on the network. Network telemetry data may help the monitoring of the health, performance, etc. of the overall network and the traffic carried thereon.

The network telemetry data for a particular data packet includes various measurements or data associated with the network node handling that packet and/or about the packet as the node is handling it. For example, the network telemetry data may include timestamps, sequence numbers, queue size, geo-location of the node that handled the packet, and the like. As used herein, telemetry data is network telemetry data.

OAM techniques may employ so-called out-of-band OAM protocols. As it is commonly understood, the OAM traffic is sent as dedicated traffic across the network nodes that is separate from the data traffic. That is, the out-of-band OAM traffic is sent via the control plane. In this instance, the network telemetry data transferred by the out-of-band OAM protocols is not affected by the data traffic. Examples of such protocols include those that are part of Ethernet Connectivity Fault Management (CFM), Ping network utility, and Traceroute network diagnostic command.

With the so-called in-band OAM protocols, the OAM traffic is embedded in the data traffic, but not part of the data payload. Thus, the OAM traffic is embedded in the header portion of the data packets of the data traffic. That is, the in-band OAM traffic is sent via the data plane. The OAM is affected by data traffic. Examples of such protocols include Internet Protocol version 4 (IPv4) route recording.

Sometimes, in-band OAM is called in-situ OAM and uses initials IOAM. As used herein, the term in-situ network telemetry data includes the telemetry portion of the data gathered and handled by IOAM data fields. The IOAM data fields may be encapsulated into a variety of protocols such as Network Service Header (NSH), Segment Routing, Generic Network Virtualization Encapsulation (Geneve), Internet Protocol version 6 (IPv6) via extension header, and IPv4.

According to the techniques described herein, a network node obtains a data packet of data traffic of a packet-switched network. The data packet includes an in-situ network telemetry block. The network node obtains present telemetry data of the network node and the data packet. The present telemetry data does not include historical data, but rather data related to a present state of the network node itself or the traversal of the data packet through the network node.

Present telemetry data may include, for example, one or more of the following: identification of the network node, measured factors regarding traversal of the data packet through the network node, an identification of an interface on which the data packet was received, an identification of an interface on which the data packet was forwarded, utilization of resources of the network node, hop limits, timestamps, buffer status, proof of transit, sequence numbers, a queue size, a geo-location of the node that handled the packet, identification of multicast distribution trees (for IP multicast or bit index explicit replication (BIER)), amount of bytes transmitted by port, rate of transmission by port, and the like The network node obtains a cryptographic key that confidentially identifies the network node. In some implementations, the cryptographic key is part of an asymmetric pair of keys, such as with so-called public-key cryptography. In some implementations, the cryptographic key is symmetric key the is confidentially shared with the network node and the verification device. In some implementations, the symmetric key is refreshed or dynamically regenerated.

The network node produces signed telemetry data by encryption of at least a portion of the present telemetry data based on the cryptographic key. In some implementations, the production of the signed telemetry data includes encryption of data from another telemetry-data entry of the in-situ network telemetry block. A previous network node of the data traffic of the packet-switched network supplies the other telemetry-data entry. As a result, the verification device may detect whether the data is fresh. That is, the telemetry data of the network node is not just a duly signed replay or a repeat of previous telemetry data. Techniques to prevent or detect a replay or repeat of duly signed old telemetry data is called replay protection herein.

The network node updates a telemetry-data entry of the in-situ network telemetry block. The telemetry-data entry is associated with the network node. The update includes insertion of the present telemetry data and signed telemetry data into the telemetry-data entry that is associated with the network node.

The network node forwards the data packet with the updated telemetry-data entry to another network node of the packet-switched network. In some implementations, the network node may be described as transmitting the data packet with the updated telemetry-data entry to the next network node of the data-traffic path of the data traffic. If the network node is the last node (i.e., egress node) of the data traffic path, then the verification device may be the node to which the updated telemetry-data entry is forwarded.

According to the techniques described herein, the verification device of the packet-switched network obtains an in-situ network telemetry block of a data packet of data traffic of a packet-switched network. Further, the verification device selects a telemetry-data entry in the in-situ network telemetry block and extracts telemetry data and signed telemetry-data from the selected telemetry-data entry. The selected entry is associated with a particular network node. The verification device obtains a cryptographic key that identifies the particular network node and decrypting data of the signed telemetry-data based on the cryptographic key. Further still, the verification device determines whether the decrypted data matches at least a portion of the telemetry data, and, in response to a match determination, the verification device verifies that the telemetry data as a valid entry by the particular network node. That is, the verification device confirms that the particular network node did, indeed, provide the extracted telemetry data in the selected entry associated with that particular network node.

Generally, the techniques described herein improve the confidence that the in-situ network telemetry data is trustworthy. According to the techniques described herein, a verification device of a packet-switched network may validate that a particular network node of that network provided the in-situ network telemetry data of a data packet of data traffic of that network by decrypting a portion of the in-situ network telemetry data that was encrypted with a confidential cryptographic key. A verification device may be a network node that receives the in-situ network telemetry data of the data packet of the data traffic on the network and performs analysis on that data. In so doing, it may perform validation.

Certain implementations and embodiments of the disclosure will now be described more fully below regarding the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example packet-switched network 100 that is suitable to facilitate the verification of in-situ network telemetry data of data packets of data traffic in accordance with the techniques described herein. The example packet-switched network 100 is a type of computer communications network that groups and sends data in the form of small data packets. It enables the sending of data packets between a source and destination node over a network channel that is shared between multiple nodes.

As depicted, the example packet-switched network 100 includes network nodes 110A, 110B, 110C, 110D, 120, 122, and 124. Also, ellipse 110E and 100F represent multiple other interconnected nodes of the network. Similarly, network 100A represents multiple interconnect nodes of the example packet-switched network 100.

It should be appreciated that the configuration and network topology described herein has been greatly simplified and that many more computing systems, software components, networks, and networking devices can be utilized to interconnect the various computing systems disclosed herein and to provide the functionality described herein.

A verification device 150 is also connected to the example packet-switched network 100. As depicted, the verification device 150 is a separate and dedicated management and/or monitoring node on the example packet-switched network 100. In other implementations, the verification device 150 may be part of a multifunctional node on the network or another device separate from the network itself. In some implementations, the verification device 150 may be a network controller.

A broad arrow represents a data-traffic path 130 across the example packet-switched network 100 on which data traffic flows. Herein, data traffic is a sequence or collection of related or connected data packets. As shown, the data traffic of the data-traffic path 130 includes data packet 132 and data packet 134. Each of the data packets 132 and 134 have an informational header and a payload, which is that actual message being transmitted. The data packets 132 and 134 are illustrated with the informational header having diagonal stripes and the payload having crosshatches.

The node 120 may generate a new sequence of data packets for new data traffic. Since the data traffic starts with node 120, the node may be described as the ingress node. Node 124 is the destination for the data traffic and, thus, may be described as the egress node. Node 122 is the only node in the data traffic path 130 between the ingress node and the egress node. Thus, node 122 is the intermediate node.

The ingress node 120 sends data packet 132 to intermediate node 122. The data packet 132 is the first data packet of the data traffic. Intermediate node 122 processes the data packet 132 and forwards it to egress node 124. As depicted, data packet 132 has just been sent by node 122 to node 124.

Then, the ingress node 120 sends data packet 134 to intermediate node 122. The data packet 134 is the second data packet of a sequence of two data packets of the data traffic. As depicted, data packet 134 has just been sent by node 120 to node 122.

Figure 2:
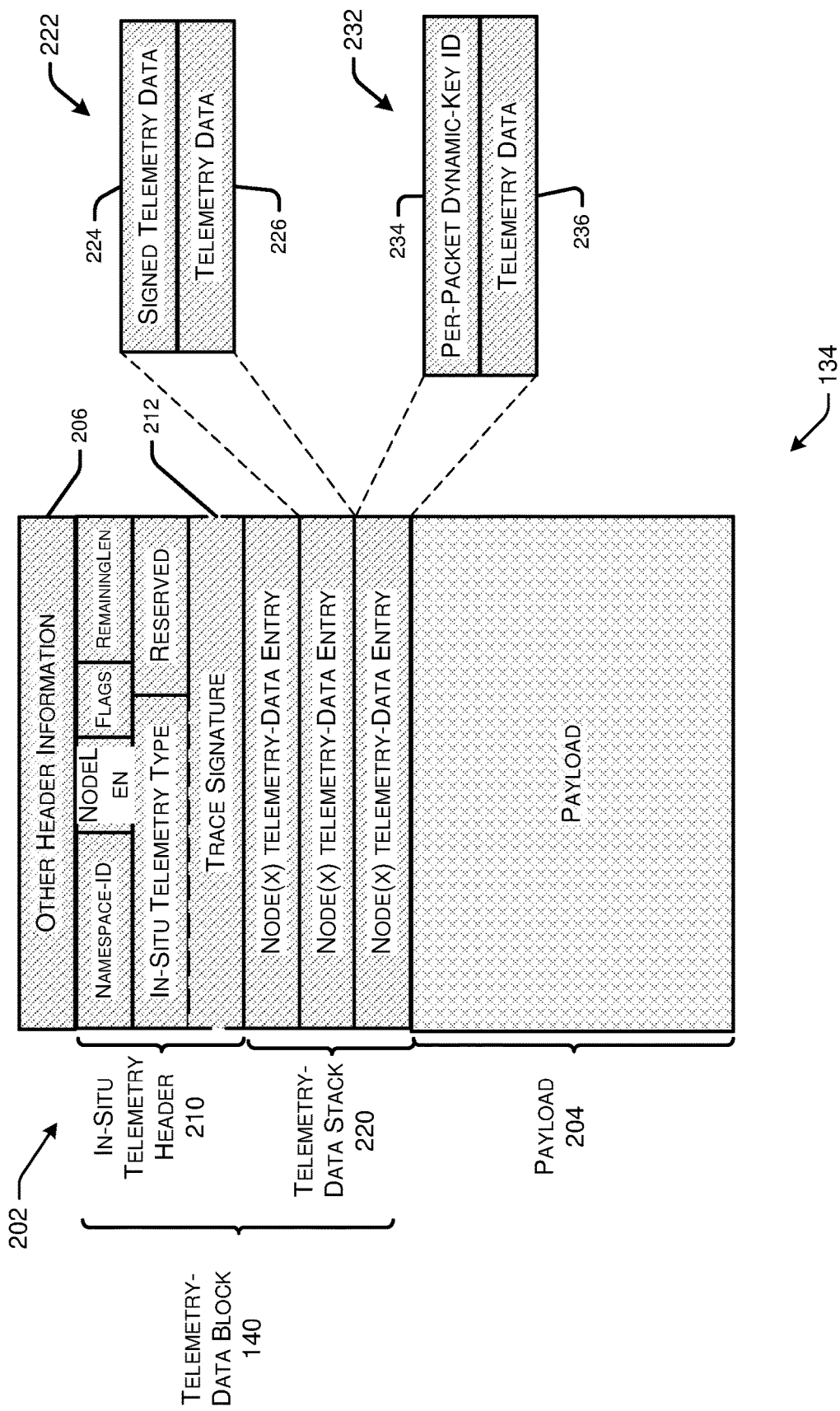
FIG. 2 illustrates an example telemetry-data entry of a telemetry-data block of a data packet of data traffic of a packet-switched network, in accordance with the techniques described herein.

FIG. 2 illustrates example data fields of data packet 134. As shown, data packet 134 includes informational header 202 and data payload 204. Other header information is represented by box 206. The other header information is not relevant to the techniques described herein.

An in-situ telemetry block 140 includes the relevant data fields in the informational header 202. The in-situ telemetry block 140 includes in-situ telemetry header 210 and telemetry-data stack 220. The in-situ telemetry header 210 includes, for example, data fields labeled Namespace-ID, NodeLen, Flags, RemaningLen, In-situ Telemetry Type, and Reserved.

An article titled "Data Fields for In-situ OAM draft-ietf-ippm-ioam-data-09" published on Mar. 8, 2020 by the Internet Engineering Task Force (IETF) describes these fields in an implementation of in-situ telemetry header. For example, Namespace-ID describes a category of in-situ telemetry implementations, NodeLen specifies the size of the telemetry-data entry for each node, Flags enables the setting of predetermined options for the functionality of the in-situ telemetry operations, RemainingLen specifies the space reserved for the telemetry-data stack 220, and in-situ telemetry type specifies the data types used in the in-situ telemetry operation.

In some implementations, the in-situ telemetry header 210 includes a trace signature field 212. The trace signature field 212 may be the location in the in-situ network telemetry block 140 where a dynamic-key identification may be included. The dynamic-key identification identifies a confidential seed key to the verification device. See the discussion herein about FIG. 5 for more on this.

Telemetry-data stack 220 includes the telemetry-data entries for each node in the data-traffic path. In some implementations, the total space is pre-allocated. In some other implementations, space is incrementally allocated while the data packet traverses the data-traffic path.

The network nodes are represented as a puck-like shape with four arrows on the top and two antennas. The antennas indicate that the nodes may be wireless, but in some instances, the nodes may be wired. Generally, a network node is a computing device that acts as a connection point that can receive, create, store, and/or transmit data to other nodes on the network. For example, a network node may include any type of networking device, such as servers, switches, routers, hubs, bridges, gateways, modems, repeaters, access points, etc. Additionally, the network nodes may include personal, user devices such as phones, tablets, wearables devices, or other personal computing devices. The network nodes may comprise physical nodes (e.g., processors, chipsets, devices, etc.), virtual nodes (virtual machines, containers, etc.), and/or any combination thereof. In some examples, the network nodes may be included in one or more physical locations.

FIG. 2 shows an example telemetry-data entry 222 of intermediate node 122. The example telemetry-data entry 222 includes signed telemetry data 224 and telemetry data 226. The other telemetry-data entries of the telemetry-data stack 220 may be similarly organized.

FIG. 2 also shows another example telemetry-data entry 232 of intermediate node 122. The other example telemetry-data entry 232 includes a per-packet dynamic-key identification 234 and its associated telemetry data 236. The other telemetry-data entries of the telemetry-data stack 220 may be similarly organized. See the discussion herein about FIG. 5 for more on this.

For the sake of simplicity of illustration, the example telemetry-data entry 222 and the other example telemetry-data entry 232 are shown in the same drawing figure and as part of the telemetry-data stack 220 of the telemetry-data block 140 of the same data packet 134. However, the format of each example telemetry-data entry represents different implementations of the technology described herein. And while the differing implementations may be combined in the manner illustrated in FIG. 2, often each will be implemented separately from the other.

To illustrate some implementations of the techniques described herein, the discussion of FIGS. 1 and 2 hereafter focus on the intermediate node 122. The intermediate node 122 obtains of a data packet 134 of the data traffic of the example packet-switched network 100. The intermediate node 122 obtains the data packet 134 from its network connection with ingress node 120. The data packet 134 includes an in-situ network telemetry block 140. The in-situ network telemetry block 140 may be part of the informational header of the data packet 134.

The intermediate node 122 obtains present telemetry data of the network node and the data packet. The present telemetry data is data related to a present state of the intermediate node 122 itself or the traversal of the data packet through the node.

The intermediate node 122 obtains a cryptographic key that confidentially identifies the network node. This key may be stored in the memory of the intermediate node 122. In some implementations, the cryptographic key is part of an asymmetric pair of keys, such as with so-called public-key cryptography. In some implementations, the cryptographic key is symmetric key the is confidentially shared with the intermediate node 122 and the verification device 150. In some implementations, the symmetric key is refreshed or dynamically regenerated.

The intermediate node 122 produces signed telemetry data by encryption of at least a portion of the present telemetry data based on the cryptographic key. The portion of the present telemetry data may be a hash or a digest of the present telemetry data.

The intermediate node 122 updates the telemetry-data entry 222 of the in-situ network telemetry block 140. The telemetry-data entry 222 is associated with the intermediate node 122. The update includes insertion of the present telemetry data at 226 and signed telemetry data at 224 of the telemetry-data entry 222 that is associated with the intermediate node 122.

The intermediate node 122 forwards the data packet 134 with the updated telemetry-data entry 222 to another network node (such as node 124) of the packet-switched network 100. In some implementations, the intermediate node 122 may be described as transmitting the data packet with the updated telemetry-data entry to the next network node (such as node 124) of the data-traffic path of the data traffic. If the network node is the last node (such as node 124) of the data traffic path, then the verification device 150 may be the node to which the updated telemetry-data entry is forwarded.

In some implementations, the production of the signed telemetry data includes encryption of data from another telemetry-data entry of the in-situ network telemetry block. For example, the other telemetry-data entry 228 may be supplied by a previous network node (such as node 120) of the data traffic. As a result, the verification device 150 may detect whether the data is fresh. That is, the telemetry data of the network node is not just a properly signed replay or a repeat of previous telemetry data.

The verification device 150 receives a network telemetry block 140 of a sequence data packets of data traffic, such as that of data traffic path 130. The verification device 150 elects a telemetry-data entry (e.g., entry 222) in the in-situ network telemetry block 140 and extracts telemetry data from field 225 and signed telemetry-data from entry 224 of the telemetry-data entry 222. The telemetry-data entry 222 is associated with a particular network node, which is intermediate node 122.

The verification device 150 obtains a cryptographic key that identifies the intermediate node 122 and decrypts data of the signed telemetry-data of entry 222 based on that cryptographic key.

The verification device 150 determines whether the decrypted data matches at least a portion of the telemetry data and, in response to a match determination, the verification device 150 verifies that the telemetry data of entry 226 as a valid entry by the intermediate node 122. That is, the verification device 150 confirms that the intermediate node 122 did, indeed, provide the extracted telemetry data in the entry 226 associated with that intermediate node 122.

FIGS. 3, 4, 5, and 6 illustrate flow diagrams of example methods 300, 400, 500, and 600 that illustrate aspects of the functions performed at least partly by network nodes that transmit data traffic across a packet-switched network and/or a verification device. The network nodes 120, 122, and 124 and the verification device 150 as described in FIG. 1 are examples of such nodes and devices in such a network. The logical operations described herein with respect to FIGS. 3, 4, 5, and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3-6 and described herein. These operations can also be performed in parallel or a different order than those described herein. Some or all of these operations can also be performed by components other than those specifically identified. Although the techniques described in this disclosure is with reference to specific components, in other examples, the techniques may be implemented by fewer components, more components, different components, or any configuration of components.

Figure 3:
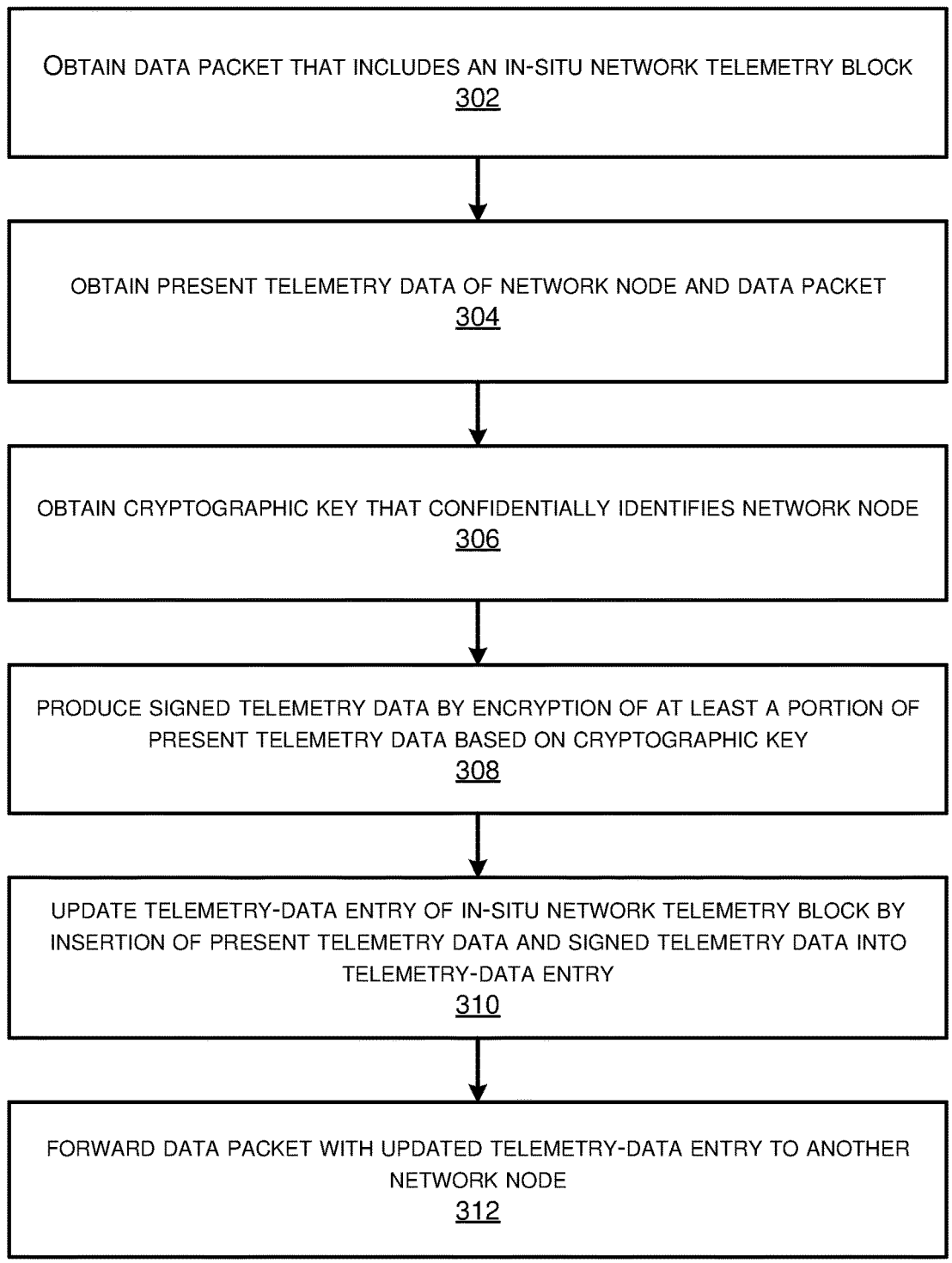
FIGS. 3-6 illustrates flow diagrams of example methods for the facilitation of the verification of in-situ network telemetry data of a data packet of data traffic of a packet-switched network, in accordance with the techniques described herein.

FIG. 3 illustrates a flow diagram of an example method 300 to facilitate the verification of in-situ network telemetry data of data packets of data traffic in accordance with the techniques described herein. In some instances, the example method 300 may be performed by a system comprising one or more processors and one or more non-transitory computer-readable media storing computer-executable instructions that, when executed by the one or more processors, cause the one or more processors to perform the steps of method 300. In some instances, the system may include the network nodes (such as nodes 120, 122, and 124 described herein).

At 302, a network node (such as node 122) obtains of a data packet (such as packet 134) of the data traffic of a packet-switched network. The data packet 134 includes an in-situ network telemetry block. The in-situ network telemetry block may be part of the informational header of the data packet 134. That is, the in-situ network telemetry block is part of the data plane.

At 304, the network node obtains present telemetry data of the network node and the data packet. The present telemetry data is data related to a present state of the network node (such as intermediate node 122) itself or the traversal of the data packet through the node.

At 306, the network node obtains a cryptographic key that confidentially identifies the network node. This key may be stored in the memory of the network node. In some implementations, the cryptographic key is part of an asymmetric pair of keys, such as with so-called public-key cryptography.

In some implementations, the network node creates or obtains a public-private key pair and shares the public key with the verification device. In such implementations, the network node uses its private key for its encryption. Then the verification device uses the node's public key to perform the decryption for the verification operation.

Many of the available public-private key approaches are suitable for use with the example method 300. Examples of such approaches include Boneh-Lynn-Shacham (BLS) signature scheme or Edwards-curve Digital Signature Algorithm (EdDSA), such as Ed25519, which is the EdDSA signature scheme using SHA-512 (SHA-2) and Curve25519.

In some implementations, the cryptographic key is symmetric key the is confidentially shared with the network node and the verification device. For example, the verification device 150 may share the symmetric key with the network node 122. In another example, a third-party (e.g., network controller) may share the symmetric key with the network node 122 and the verification device 150.

To increase the trustworthiness of the handling of a shared symmetrical key, some implementations may change the symmetrical key from time to time. In some implementations, the symmetrical key is refreshed or dynamically regenerated. Some of these implementations will be discussed with regard to descriptions of FIGS. 4 and 5.

At 308, the network node produces signed telemetry data by encryption of at least a portion of the present telemetry data based on the cryptographic key. The portion of the present telemetry data may be a hash or a digest of the present telemetry data.

In some implementations, the production operation 308 may include encryption of data from another telemetry-data entry of the in-situ network telemetry block. For example, a previous node (e.g., node 120) may supply the other telemetry-data entry 228. As a result, the verification device may be able to detect whether the data is fresh. That is, the telemetry data of the network node is not just a properly signed replay or a repeat of previously transmitted telemetry data.

At 310, the network node updates the telemetry-data entry (such as entry 222) of the in-situ network telemetry block (such as block 140). The telemetry-data entry is associated with the network node. The update includes insertion of the present telemetry data and signed telemetry data into the telemetry-data entry that is associated with the network node.

At 312, the network node forwards the updated data packet to another network node (such as node 124) of the packet-switched network. The updated data packet has the updated telemetry-data entry therein. In some implementations, the network node may be described as transmitting the data packet with the updated telemetry-data entry to the next network node (such as node 124) of the data-traffic path of the data traffic. If the network node is the last node (such as node 124) of the data traffic path, then the verification device may be the node to which the updated telemetry-data entry is forwarded.

Figure 4:
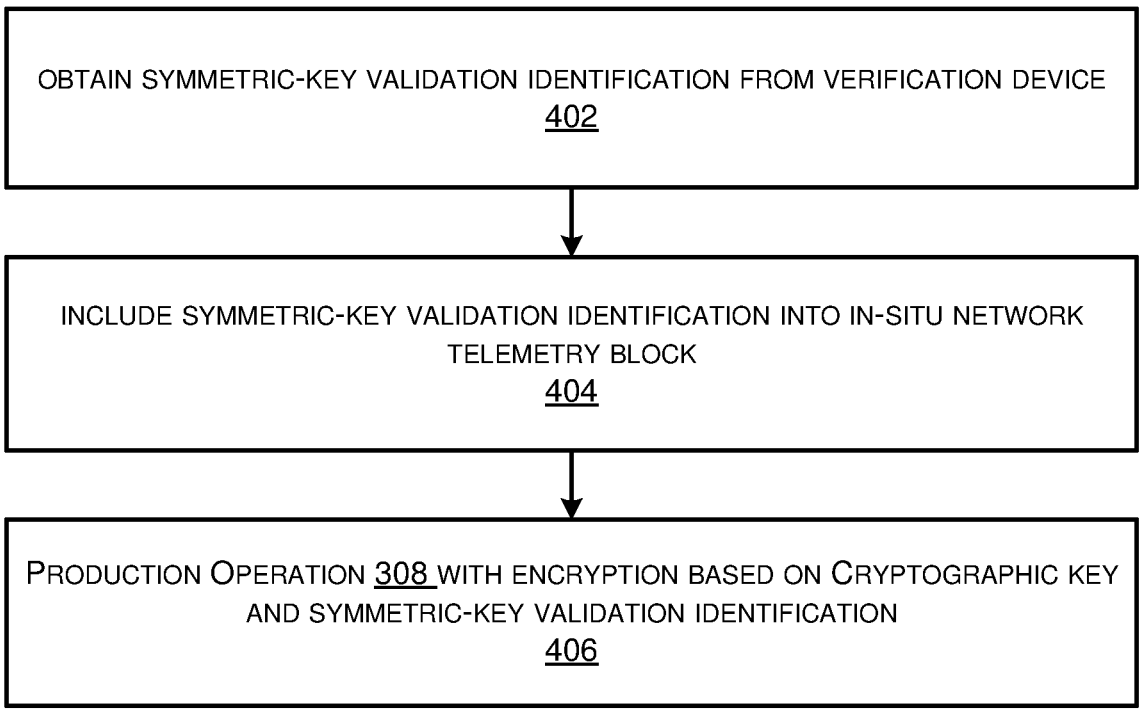

FIG. 4 illustrates a flow diagram of an example method 400 to facilitate the verification of in-situ network telemetry data of data packets of data traffic in accordance with the techniques described herein. More particularly, the example method 400 adds additional steps to refresh the synchronization of a confidential symmetric key known by the network node and the verification device. The example method 400 also modifies the production operation 308 of example method 300.

At 402, a network node obtains an updated cryptographic key that is a confidential symmetric key that is shared between the network node and the verification device. In some instances, the example method 400 may be performed by a system comprising one or more processors and one or more non-transitory computer-readable media storing computer-executable instructions that, when executed by the one or more processors, cause the one or more processors to perform the steps of method 400. In some instances, the system may include the network nodes (such as nodes 120, 122, and 124 described herein).

The network node obtains the updated cryptographic key from the verification device. Also, the network node obtains a symmetric-key validation identification from the verification device. The symmetric-key validation identification is associated with the verification device and the network node. Alternatively, the symmetric-key validation identification may be associated with the updated cryptographic key.

At 404, the network node includes the symmetric-key validation identification into the in-situ network telemetry block. As depicted in FIG. 2, the trace signature field 212 in the in-situ telemetry header 210 is the location in the in-situ network telemetry block 140, where the symmetric-key validation identification may be included.

At 406, the production operation 308 of example method 300 is modified so that the encryption is based on both the updated cryptographic key and the symmetric-key validation identification.

In this way, the verification device can refresh the symmetric cryptographic keys from time to time, and the encryption using the symmetric-key validation identification helps increase the trustworthiness of the in-situ telemetry data.

Figure 5:
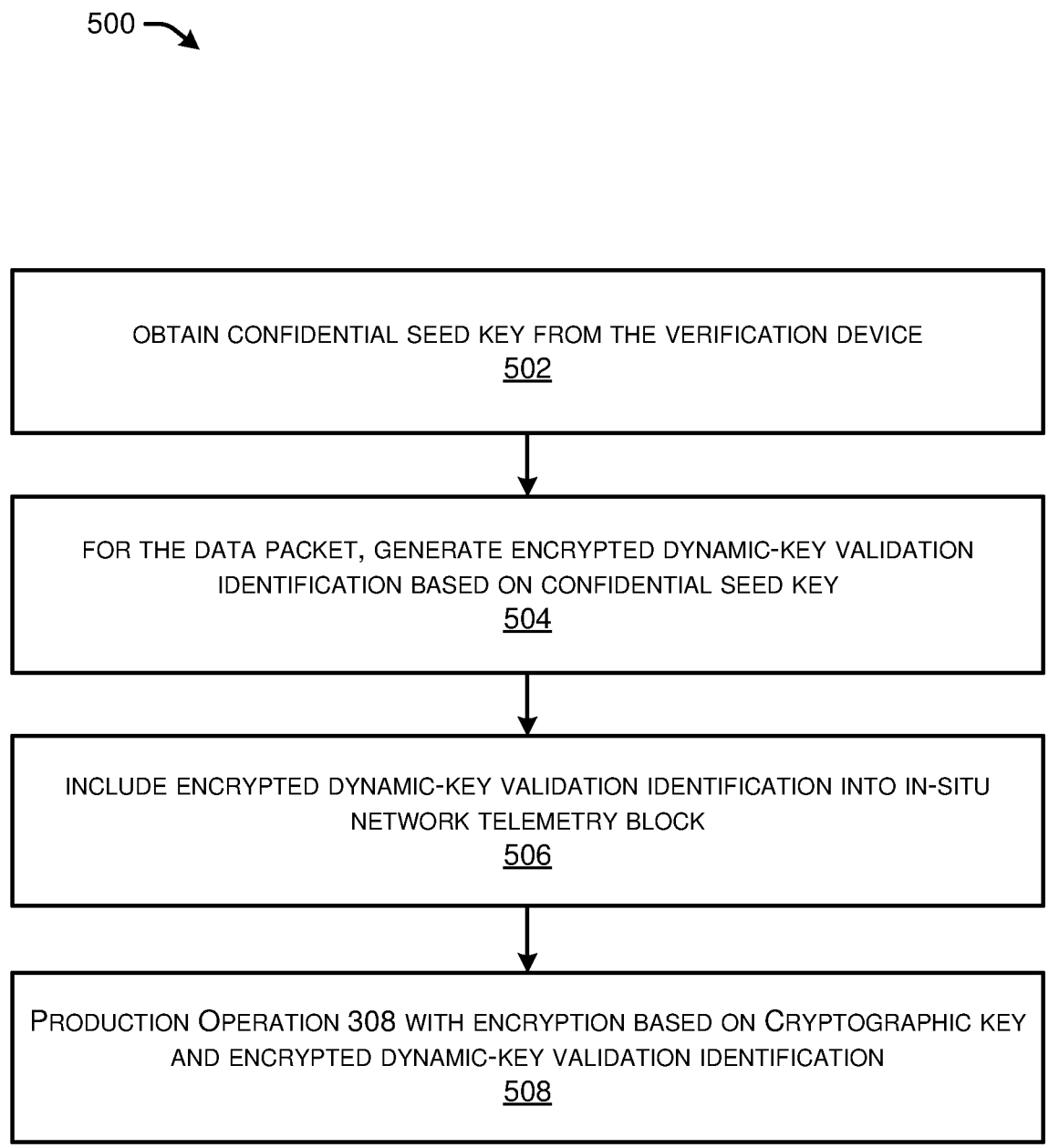

FIG. 5 illustrates a flow diagram of an example method 500 to facilitate the verification of in-situ network telemetry data of data packets of data traffic in accordance with the techniques described herein. More particularly, the example method 500 adds additional steps to dynamically generate a confidential symmetric key known by the network node and derivable by the verification device. The example method 500 also modifies the production operation 308 of example method 300.

In some instances, the example method 500 may be performed by a system comprising one or more processors and one or more non-transitory computer-readable media storing computer-executable instructions that, when executed by the one or more processors, cause the one or more processors to perform the steps of method 500. In some instances, the system may include the network nodes (such as nodes 120, 122, and 124 described herein).

At 502, a network node obtains a confidential seed key from the verification device. The confidential seed key being associated with the verification device. And it is confidential between the verification device and one or more network nodes, which includes the network node that is the subject of operation 502.

Operation 502 may be accomplished, for example, by establishing a common secret between the verification device and the network node. For this approach, for example, the verification device shares the public key of a public-private key pair with the network node. Indeed, the verification device may distribute the same key to a large number of nodes with zero-touch provisioning. That same key is the public key of the verification device.

For example, the verification device may generate the public-private key pair using a cryptosystem that incorporates randomness. McEliece is an example of such a cryptosystem. Indeed, some implementations may employ a post-quantum cryptography variation of McEliece cryptosystem.

The network node generates a random secret seed and encrypts it with the public key supplied by the verification device. The generated random secret seed is the confidential seed key. The network node sends the encrypted confidential seed key to the verification device. Using the node's private key, the verification device decrypts the encrypted confidential seed key to obtain the confidential seed key that the node generated randomly. This establishes the confidential seed key between the verification device and the network node, which can be used to generate the dynamic symmetric key.

At 504, for each data packet of a plurality of data packets, the network node generates a dynamic-key identification based on the confidential seed key. The dynamic-key identification is associated with a single data packet of the plurality of data packets. Thus, the network node dynamically generates a new key for each data packet of a group or sequence of data packets. The dynamic-key identification effectively identifies the confidential seed key to the verification device.

At 506, the network node includes the dynamic-key identification into the in-situ network telemetry block. As depicted in FIG. 2, the trace signature field 212 in the in-situ telemetry header 210 may be the location in the in-situ network telemetry block 140, where the dynamic-key identification may be included.

In some implementations, the trace signature field 212 in the in-situ telemetry header 210 maybe the location in the in-situ network telemetry block 140, where the confidential seed key may be included. In some implementations, the confidential seed key may be included in the telemetry-data entry for the network node.

At 508, the production operation 308 of example method 300 is modified so that the encryption is based on both the updated cryptographic key and the dynamic-key identification.

Using the example method 500 with the example method 300, the network node may generate a symmetric key for each packet, set of packets, or data traffic. The example method 500 does not use a seed since a private key is derived per packet (or set of packets). As such, no seed is added to the telemetry-data entry of the network node to enable replay protection. The dynamic generation of symmetric keys helps provide the replay protection.

Figure 6:
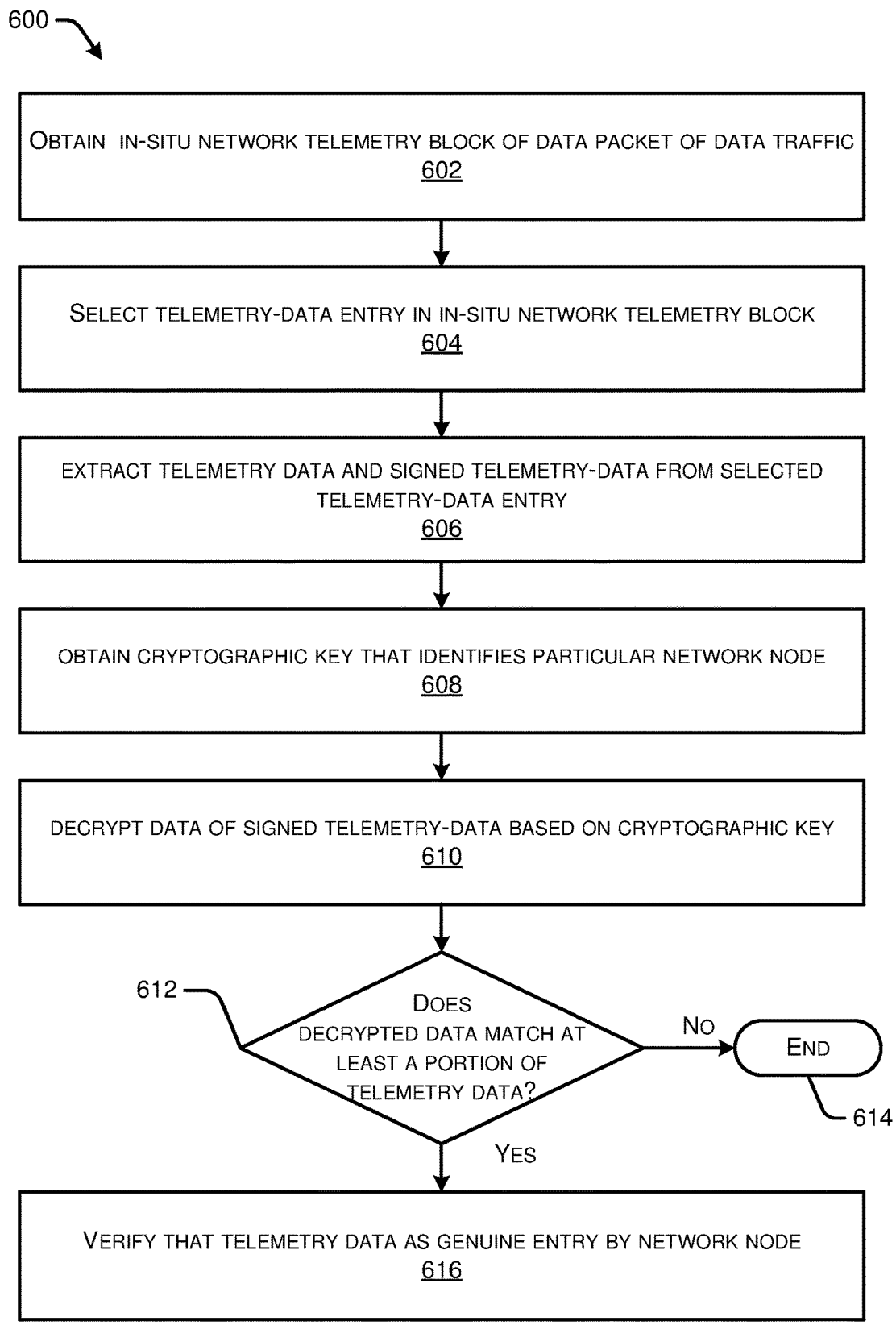

FIG. 6 illustrates a flow diagram of an example method 600 to facilitate the verification of in-situ network telemetry data of data packets of data traffic in accordance with the techniques described herein. More particularly, the example method 600 has the verification device determining whether the telemetry data of the telemetry-data entry is genuine and thus trustworthy.

In some instances, the example method 600 may be performed by a system comprising one or more processors and one or more non-transitory computer-readable media storing computer-executable instructions that, when executed by the one or more processors, cause the one or more processors to perform the steps of method 600. In some instances, the system may include the network nodes (such as nodes 120, 122, and 124 described herein).

At 602, a verification device obtains an in-situ network telemetry block of a data packet of data traffic of a packet-switched network. As shown in FIG. 1, the verification device 150 receives the in-situ network telemetry block 140.

At 604, the verification device selects a telemetry-data entry in the in-situ network telemetry block. The selected entry is associated with a particular network node. For example, the verification device 150 may select entry 222, which is associated with node 122.

At 606, the verification device extracts telemetry data and signed telemetry-data from the selected telemetry-data entry.

At 608, the verification device obtains a cryptographic key that identifies the particular network node. If the cryptographic key is part of an asymmetric key pair, the verification device uses the public key of that pair. If the cryptographic key is symmetrical, then the verification device uses a known confidential key associated with that particular network node. In some instances, the verification device may determine the symmetric key based on an identifier in the telemetry-data entry or elsewhere in the in-situ network telemetry block.

At 610, the verification device decrypts data of the signed telemetry-data based on the cryptographic key.

In some implementations, the decryption may include a selection of another entry in the in-situ network telemetry block. The other entry is associated with a previous network node of the data traffic that traversed the data-traffic path across the packet-switched network. The decryption of data of the signed telemetry-data is based on the cryptographic key and data from the other selected entry in the in-situ network telemetry block.

At 612, a verification device determines whether the decrypted data matches at least a portion of the telemetry data. If not, then the example method 600 ends at 614. Otherwise, the example method 600 continues to operation 616.

At 616, the verification device, in response to a determination of a match, verifies that the telemetry data as a genuine entry by the network node. That is, the verification device deems that the telemetry data has not been tampered with.

Figure 7:
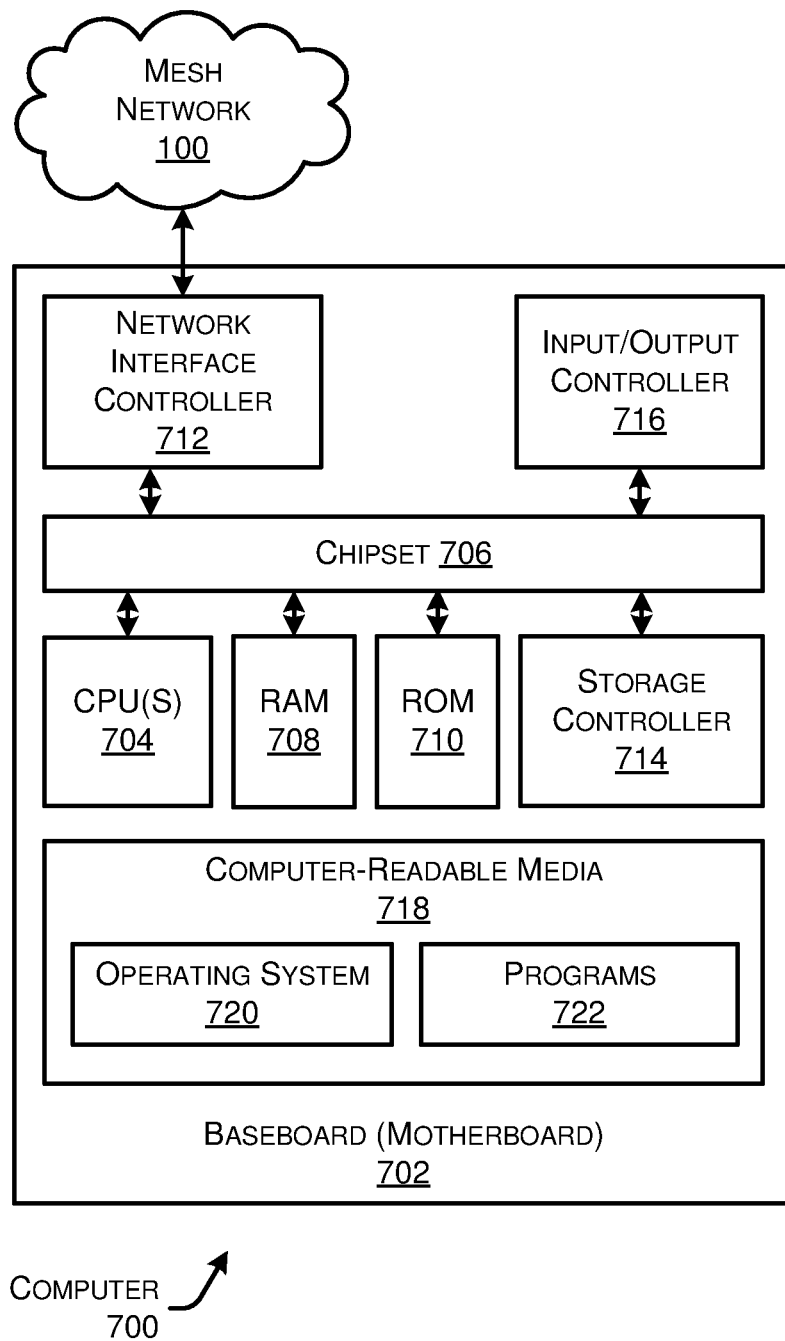
FIG. 7 is a computer architecture diagram showing an illustrative computer hardware architecture for implementing a network node that can be utilized to implement aspects of the various technologies presented herein.

FIG. 7 shows an example computer architecture for a network node 700 capable of executing program components for implementing the functionality described above. The computer architecture shown in FIG. 7 illustrates a conventional server computer, workstation, desktop computer, laptop, tablet, network appliance, e-reader, smartphone, or another computing device, and can be utilized to execute any of the functionalities presented herein. The network node 700 may, in some examples, correspond to one of many types of network devices, such as servers, switches, routers, hubs, bridges, gateways, modems, repeaters, access points, etc.

The network node 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the network node 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the network node 700. The chipset 706 can further provide an interface to a computer-readable storage medium such as read-only memory ("ROM") 710 or non-volatile RAM ("NVRAM") for storing basic routines that help to startup the network node 700 and to transfer information between the various components and devices. The ROM 710 or NVRAM can also store other software components necessary for the operation of the network node 700 in accordance with the configurations described herein.

The network node 700 can operate in a networked environment using logical connections to remote computing devices and computer systems through a network, such as the network 100. The chipset 706 can include functionality for providing network connectivity through a NIC 712, such as a gigabit Ethernet adapter. The NIC 712 is capable of connecting the network node 700 to other computing devices over the network 100 (and/or 102). It should be appreciated that multiple NICs 712 can be present in the network node 700, connecting the computer to other types of networks and remote computer systems.

The network node 700 can be connected to a storage device 718 that provides non-volatile storage for the computer. The storage device 718 can store an operating system 720, programs 722, and data, which have been described in greater detail herein. The storage device 718 can be connected to the network node 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other types of interface for physically connecting and transferring data between computers and physical storage units.

The network node 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the network node 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete components in a solid-state storage unit. Other transformations of physical media are possible without departing from the scope and spirit of the present description, with the foregoing examples provided only to facilitate this description. The network node 700 can further read information from the storage device 718 by detecting the physical states or characteristics of one or more particular locations within the physical storage units.

In addition to the mass storage device 718 described above, the network node 700 can have access to other computer-readable storage media to store and retrieve information, such as program modules, data structures, or other data. It should be appreciated by those skilled in the art that computer-readable storage media is any available media that provides for the non-transitory storage of data, and that can be accessed by the network node 700.

In some examples, the operations performed by the verification device 150 and/or the network nodes of the network 100, and or any components included therein, may be supported by one or more devices similar to network node 700. Stated otherwise, some or all of the operations performed in accordance with methods 300, 400, 500, and 600 may be performed by one or more network nodes 700 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the network node 700. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the network node 700.

In one embodiment, the storage device 718 or other computer-readable storage media is encoded with computer-executable instructions which, when loaded into the network node 700, transform the computer from a general-purpose computing system into a special-purpose computer capable of implementing the embodiments described herein. These computer-executable instructions transform the network node 700 by specifying how the CPUs 704 transition between states, as described above. According to one embodiment, the network node 700 has access to computer-readable storage media storing computer-executable instructions which, when executed by the network node 700, perform the various processes described above with regard to FIGS. 3-6. The network node 700 can also include computer-readable storage media having instructions stored thereupon for performing any of the other computer-implemented operations described herein.

The network node 700 can also include one or more input/output controllers 716 for receiving and processing input from several input devices, such as a keyboard, a mouse, a touchpad, a touch screen, an electronic stylus, or other types of input devices. Similarly, an input/output controller 716 can provide output to a display, such as a computer monitor, a flat-panel display, a digital projector, a printer, or other types of output devices. It will be appreciated that the network node 700 might not include all of the components shown in FIG. 7, can include other components that are not explicitly shown in FIG. 7, or might utilize an architecture completely different than that shown in FIG. 7.

As described herein, the network node 700 may include one or more hardware processors 704 (processors) configured to execute one or more stored instructions. The processor(s) 704 may comprise one or more cores. Further, the network node 700 may include one or more network interfaces configured to provide communications between the network node 700 and other devices, such as communications. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure performed by the verification device 150 and/or SND sub-controller. For instance, the programs 722 may cause the network node 700 to perform techniques for distributed sub-controller permission for control of data-traffic flow within SDN networks for the purpose of limiting control plane traffic of the network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
obtain, by a network node, a data packet of data traffic of a packet-switched network, wherein the data packet includes an In-Situ Operations, Administration, and Maintenance (IOAM) data field;
populating the IOAM data field with IOAM data;
using a cryptographic key and the IOAM data, generating a signature that proves integrity of the IOAM data in the IOAM data field;
populating a signature field of the data packet with the signature that proves integrity of the IOAM data; and
sending the data packet, that includes the IOAM data and signature, to another node.

2. The method of claim 1, wherein the network node is a transit node in the network, further comprising:
calculating a hash of the IOAM data,
wherein the signature is generated over at least the hash of the IOAM data.

3. The method of claim 1, wherein the network node is an encapsulating node in the network, further comprising:
calculating a hash of the IOAM data;
creating a nonce and storing the nonce in a nonce field of the packet,
wherein the signature is generated over at least the hash of the IOAM data and the nonce.

4. The method of claim 1, wherein the IOAM data field is a pre-allocated trace option field.

5. The method of claim 1, wherein the IOAM data field is an incremental trace option field.

6. The method of claim 1, wherein the cryptographic key is part of an asymmetric pair of keys.

7. The method of claim 1, wherein the cryptographic key is a confidential symmetric key that is shared between the network node and a verification device.

8. A network node comprising:
one or more processors; and
one or more non-transitory computer-readable media storing computer-executable instructions that, when executed by the one or more processors, cause the one or more processors to perform operations of:
obtaining a data packet of data traffic of a packet-switched network, wherein the data packet includes an In-Situ Operations, Administration, and Maintenance (IOAM) data field;
populating the IOAM data field with IOAM data;
using a cryptographic key and the IOAM data, generating a signature that proves integrity of the IOAM data in the IOAM data field;
populating a signature field of the data packet with the signature that proves integrity of the IOAM data; and
sending the data packet, that includes the IOAM data and signature, to another node.

9. The network node of claim 8, wherein the network node is a transit node in the network, further comprising:
calculating a hash of the IOAM data,
wherein the signature is generated over at least the hash of the IOAM data.

10. The network node of claim 8, wherein the network node is an encapsulating node in the network, further comprising:
calculating a hash of the IOAM data;
creating a nonce and storing the nonce in a nonce field of the packet,
wherein the signature is generated over at least the hash of the IOAM data and the nonce.

11. The network node of claim 8, wherein the IOAM data field is a pre-allocated trace option field.

12. The network node of claim 8, wherein the IOAM data field is an incremental trace option field.

13. The network node of claim 8, wherein the cryptographic key is part of an asymmetric pair of keys.

14. The network node of claim 8, wherein the cryptographic key is a confidential symmetric key that is shared between the network node and a verification device.

15. A system comprising:
one or more processors; and
one or more non-transitory computer-readable media storing computer-executable instructions that, when executed by the one or more processors, cause the one or more processors to perform operations of:
obtaining a data packet of data traffic of a packet-switched network, wherein the data packet includes an In-Situ Operations, Administration, and Maintenance (IOAM) data field;
populating the IOAM data field with IOAM data;
using a cryptographic key and the IOAM data, generating a signature that proves integrity of the IOAM data in the IOAM data field;
populating a signature field of the data packet with the signature that proves integrity of the IOAM data; and
sending the data packet, that includes the IOAM data and signature, to another node.

16. The system of claim 15, wherein the system is a transit node in the network, further comprising:
calculating a hash of the IOAM data,
wherein the signature is generated over at least the hash of the IOAM data.

17. The system of claim 15, wherein the system is an encapsulating node in the network, further comprising:
calculating a hash of the IOAM data;
creating a nonce and storing the nonce in a nonce field of the packet,
wherein the signature is generated over at least the hash of the IOAM data and the nonce.

18. The system of claim 15, wherein the IOAM data field is a pre-allocated trace option field.

19. The system of claim 15, wherein the IOAM data field is an incremental trace option field.

20. The system of claim 15, wherein the cryptographic key is part of an asymmetric pair of keys.

\* \* \* \* \*